Figure 1:
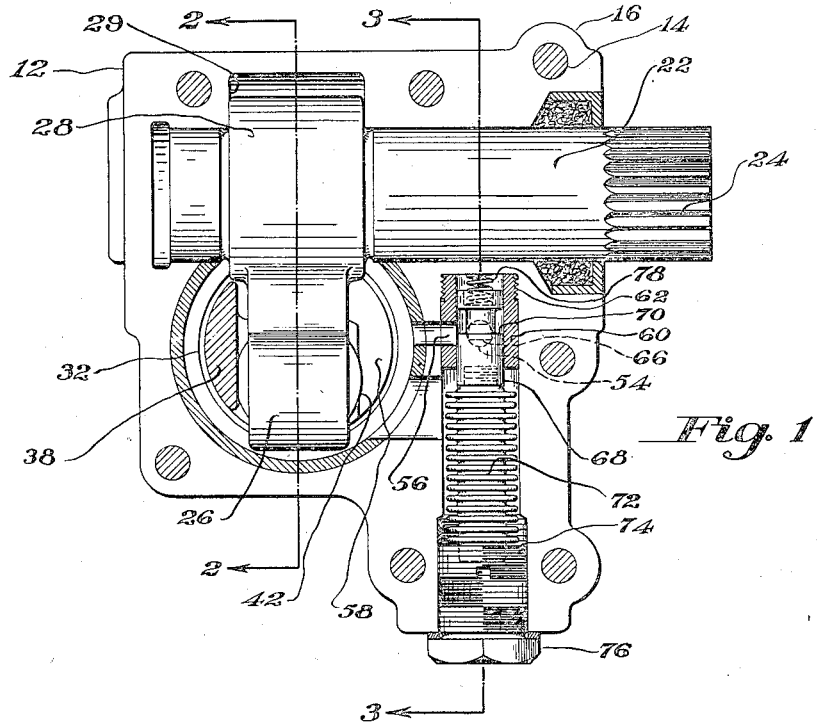

Dec. 24, 1935.  W. C. ROBBINS  2,025,423

FLUID TYPE SHOCK ABSORBER

Filed Dec. 16, 1931  2 Sheets-Sheet 1

Witness
Paul F. Bryant

Inventor
Walter C. Robbins
by his Attorneys
Van Evera Fish Albrecht Cary

Patented Dec. 24, 1935

2,025,423

UNITED STATES PATENT OFFICE 2,025,423

FLUID TYPE SHOCK ABSORBER

Walter C. Robbins, Brookline, Mass., assignor to Thermo Hydraulic Shock Absorber Company, Cambridge, Mass., a corporation of Delaware Application December 16, 1931, Serial No. 581,403

13 Claims. (Cl. 188—88)

The present invention relates to vehicle shock absorbers, and more particularly to shock absorbers of the fluid type in which the necessary damping resistance is created by opposing a resistant fluid flow to the movement of a piston or the like.

In instruments of this type it is customary to provide the necessary resistance to fluid flow by causing the fluid, generally in the nature of a viscous fluid, to pass through a restricted passage or orifice and govern or measure the resistance thus created by controlling the size of the orifice either with a manually adjustable valve or a spring loaded relief valve, or a combination of both.

It is recognized in instruments of this type that the restriction imposed upon fluid flow shall be predetermined and of such a character that the operation of a shock absorber is predictable. This is difficult of accomplishment where control is afforded by spring loaded valves or the like. On the other hand, attempts to meter liquid flow with an orifice of constant dimensions independently of whether or not such orifices may be manually adjusted, present the difficulty that the viscosity of the liquid varies with temperature, and in consequence presents a variable resistance to the movement of the piston which may increase markedly as the temperature drops below the normal range, and by the same token decrease markedly as the temperature rises in the opposite direction. To compensate for this difficulty it has been suggested heretofore that a fixed orifice be provided with temperature controlled means for varying the orificial opening in accordance with the temperature, the opening increasing in size as the temperature drops, and correspondingly decreasing in size as the temperature rises. Such a device, if properly designed and constructed, is definitely superior in its mode of operation and shock absorbing function to a liquid shock absorber in which control of fluid flow is attempted through the use of spring loaded reliefs or the like.

The purpose of the present invention is accordingly to provide a shock absorber of the fluid type which presents an accurate and predictable resistance to piston movement regardless of the viscosity of the cushioning liquid as determined by temperature conditions.

A further object of the invention is to incorporate in the same instrument a predictable and controllable resistance to spring flexure in opposite directions, properly coordinated to insure the best riding qualities, and moreover a resistance unaffected by temperature changes in either direction of movement.

A still further object of the invention is to provide an instrument of this type which is simple to construct, which has a minimum opportunity for leakage of fluid from within, and the adjustment of which to vary the character of the ride may be facilitated without dismantling and removing the instrument.

With these and other and similar objects in view, one feature of the invention contemplates the provision of a controlling valve for metering liquid flow under the action of the piston, this valve being connected with and adjusted by a bellows thermostat which causes the valve at all times to assume a position in which fluid resistance to the movement of the piston is substantially unvariable under widely different temperature conditions.

A further feature of the invention contemplates the provision of a shock absorber having two fluid chambers, each provided with a piston for the purpose of opposing spring flexure both on impact and rebound, fluid flow resisting the working movement of each piston being controlled by a single temperature compensated valve in such a manner as to make the ride resistance on both impact and rebound predictable and unaffected by temperature conditions. In this type of instrument the single control valve, as stated, meters the flow from both fluid chambers alternately upon successive movements of impact and rebound of the spring, with the position of the valve automatically adjusted for temperature conditions. The temperature controlled valve may be readily adjusted to synchronously vary the impact and rebound resistance without dismantling the instrument, and thereafter the temperature compensation insures the maintenance of this set resistance so long as the instrument is maintained with a working quantity of liquid and the necessary tight fits therein.

Still further features of the invention consist in certain novel features of construction, combinations and arrangements of parts hereinafter described and claimed, the advantages of which will be obvious to those skilled in the art from the following description.

Figure 4:
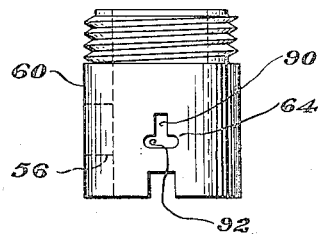
Figure 5:
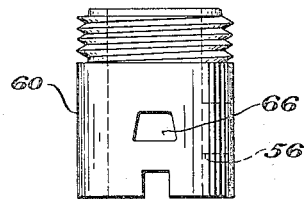
Figure 2:
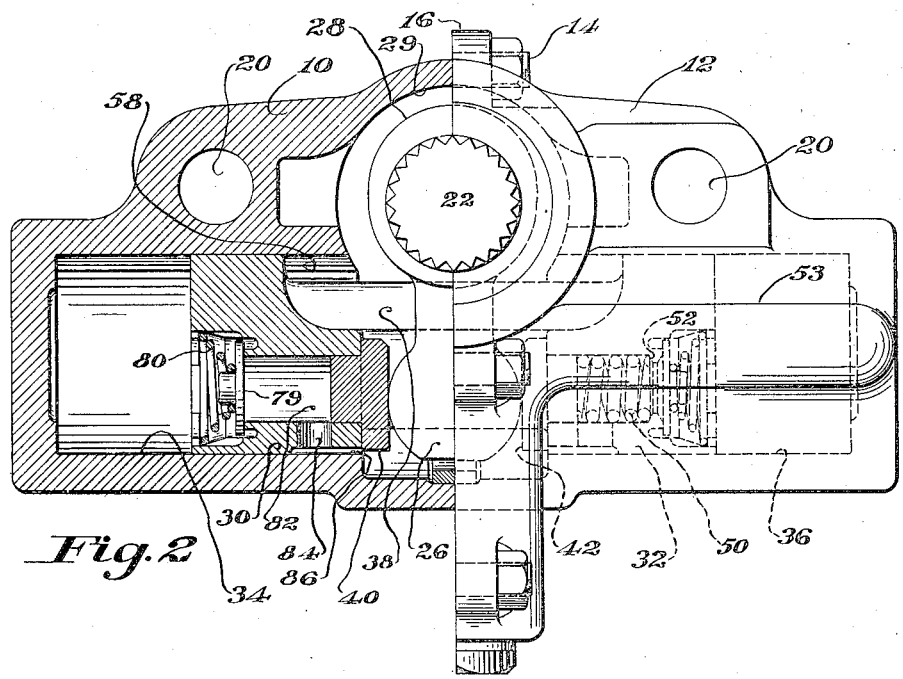
Figure 3:
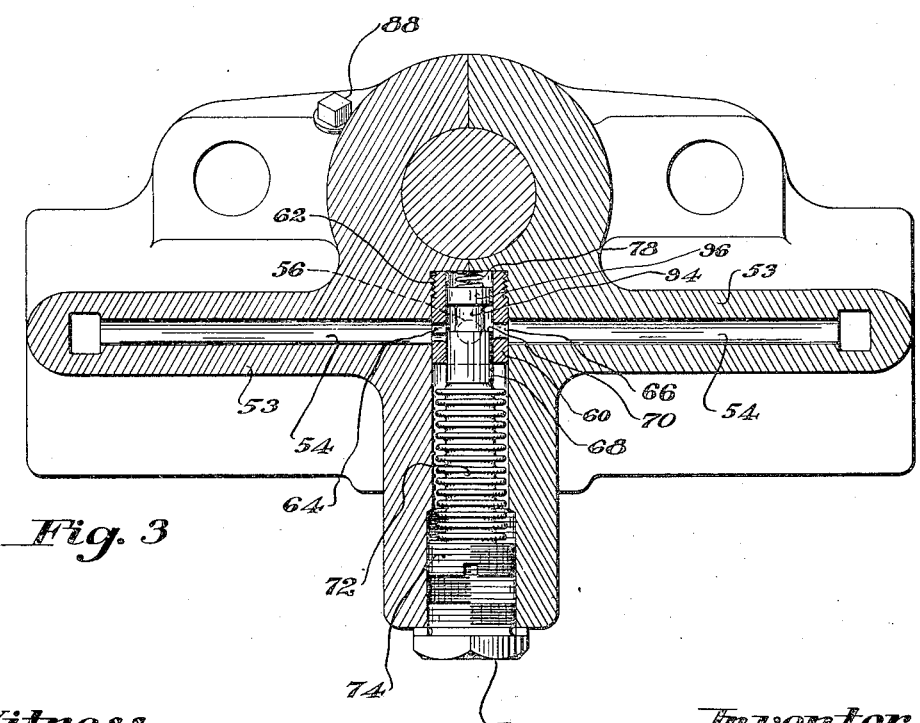

In the accompanying drawings, Fig. 1 represents a section in elevation of the instrument; Fig. 2 is a section upon the line 2—2 of Fig. 1; Fig. 3 is a section upon the line 3—3 of Fig. 1; and Figs. 4 and 5 are details of the detachable sleeve containing the orificial openings.

Referring to the drawings, the casing of the shock absorber is made in two parts indicated, respectively at 10 and 12, and parted midway of the instrument on a plane intersecting the operating shaft and accompanying connections. The two halves of the instrument are conveniently connected in assembled relation by through bolts 14, which are mounted in cooperating flanges 16. By so constructing the instrument, the machining of the fluid chamber, cooperating cylinder, pressure chambers and general bearings for the moving parts is greatly facilitated.

The instrument is designed for attachment to the frame of a motor vehicle by bolt openings 20, as indicated. Extending transversely of the upper portion of the casing and journaled therein is an oscillating shaft 22, adapted for attachment at its outer end 24 to the usual operating arm, which in turn is connected with the axle of the vehicle through a link or similar instrumentality, not shown. The oscillating shaft is provided adjacent its inner end with a depending arm 26, which may be formed integral therewith if so desired, and has a locating projection 28 which, in cooperation with a recess 29 in the casing, serves to accurately locate the shaft lengthwise and prevent play. The depending arm 26 is engaged between cooperating or complementary pistons 30 and 32, disposed at opposite sides of the arm and sliding respectively in cylindrical chambers 34 and 36, formed in the casing, as will be evident from the drawings. The two piston members are integrally connected by a web 38, and are caused to closely engage the arm 26 at opposite sides through wear pieces 40 and 42. The wear piece 40 may be directly mounted in the piston 30, as indicated, and the wear piece 42 may be slidingly received in the piston 32 and retained in engagement with the arm by a heavy spring 50, this spring being interposed between the reduced portion of the wear piece and an integral shoulder 52 extending inwardly from the bore of the piston. This spring construction merely insures an avoidance of play between the arm and the pistons engaging therewith.

With this construction it will be obvious that movements of the operating arm in either direction due to spring flexure cause a corresponding movement of the arm 26 and connected pistons within the cylinder. If these cylinders are maintained liquidly filled and escape of liquid is permitted only through a restricted orifice, a resistance is in consequence created to movement in either direction. In order to provide for this resistance, as indicated more particularly in Fig. 3, each half of the casing is provided with a rib 53, within which is formed a passage 54, communicating freely in each case at its outer end with the ends of the cylindrical chambers 34 and 36. These passages extend lengthwise of the casing to a point approximately central, and at this point communicate with a passage 56 leading directly into the fluid replenishing chamber 58. Thus movement of the pistons in either direction forces liquid through the outlet passage and thence back to the fluid chamber, the direction of flow depending upon the direction of movement of the pistons. This flow is restricted and governed by providing a detachable sleeve 60, which threads into the casing at 62 and has port openings 64 and 66 designed to accurately regulate the flow therethrough to provide a governed orificial flow. The flow through these port openings is controlled by a bellows-operated valve 68, slidingly supported within a sleeve and designed to cut off a portion of the orifice with the edge 70 as the valve moves inwardly in Fig. 3.

In order to cause regulation of the orificial flow to be governed in accordance with temperature changes, the valve 68 is connected directly with a bellows thermostat 72, which is filled with an expansible liquid and hermetically sealed, this liquid expanding and contracting with changes in temperature, and operating the valve in a like manner to restrict the orificial openings to a greater or less extent, depending upon temperature conditions. The valve and thermostat assembly are connected at their outer ends with a threaded plug 74, which may be adjusted to determine the initial setting of the assembly. After such setting, as will be hereinafter more fully described, the opening is closed by a cap nut 76. A spring 78 located beyond the bellows valve and tending to constantly force the bellows into contracted position, insures against any tendency for the bellows to remain in expanded position after the temperature has been reduced.

From the foregoing, it will be evident that fluid resistance to movement of the pistons 30 and 32 is created by restricting the flow of fluid from either fluid working chamber through the ported valve which controls exhaust into the fluid replenishing chamber. By virtue of this construction, resistance is provided against spring flexure both on the movement of impact and on the movement of rebound. In the illustrated embodiment of the invention, resistance to movement of impact is less than that of rebound, and is afforded by metering liquid flow through the port 66 upon movement of the piston 32 to the right in Fig. 2. In a like manner, resistance to spring rebound is afforded by the more restricted port 64 through which liquid is directed upon movement of the piston 30 to the left in Fig. 2.

Replenishment of the working chambers 34 and 36 occurs upon the non-working or replenishment stroke of each piston, and is accomplished by drawing fluid directly from the fluid chamber 58 through the head of the piston in each case. This will be evident from an inspection of Fig. 2 of the drawings from which it may be observed that after the piston 30 has moved outwardly to the left, forcing liquid to the fluid chamber through the restricted port, it is caused to return to the right in correspondence with movement of the piston 32 which is then on the working stroke. This return movement of the piston 30 creates a partial vacuum within the chamber 34, which lifts the replenishing valve 79 against the light spring 80, and permits the free inflow of fluid to the chamber 34 through the main port 82 within the piston and a smaller transverse port 84 communicating directly with the fluid chamber by virtue of a recessed or grooved portion 86 in the side of the piston. The fluid chamber 36 is replenished in an identically similar manner through the piston 32 upon the return stroke of the latter. It will be noted that the pressure within the fluid replenishing chamber is substantially atmospheric, and that the difference in pressure serving for replenishment is caused by the partial vacuum which exists in each of the fluid chambers upon the return stroke of the piston. Replenishment of the fluid chamber when needed is accomplished through a filling plug 88, as indicated in Fig. 3.

Reference to Figs. 1 and 3 to 5 of the drawings will indicate the construction of the fluid metering valve, which comprises essentially a sleeve threaded into the main body of the absorber, and having two ports 64 and 66 controlling respectively spring movement on rebound and impact. The more restricted port 64 controlling the movement of rebound is provided with a comparatively narrow portion 90 and an enlarged portion 92. The opposed impact port 66 is substantially larger than the port 64, and comprises a four-sided opening slightly tapered to progressively restrict flow as the valve is closed. Cooperating with these openings is a plug valve 75

68 of generally cylindrical formation sliding within the sleeve and having an edge 70 which is designed to cut off and progressively diminish the port openings as the bellows expands with elevation of temperature. Beyond the controlling edge the valve is provided with a reduced portion 94, terminating in an enlarged bearing portion 96 which is guided within the sleeve beyond the ports. The inlet port 56 communicating with the fluid chamber is disposed between the ports 64 and 66, and flow thereinto is determined by the position of the leading edge 70 with respect to the metering ports. It will be evident that by bodily adjusting the position of the bellows thermostat and connected valve initially with respect to the ports the restriction produced thereby at any given temperature may be correspondingly varied. In practice it is found that admirable results are obtained by so adjusting the position of the valve that at 32° F. approximately the leading edge 70 is withdrawn to expose the enlarged portion 92 of the restricted port 64 and permit at lower temperatures virtual dumping of liquid into the fluid chamber without substantial restriction. By the same token, at this position of the leading edge no substantial restriction is afforded by the full open port 66. With this arrangement of ports also the resistance presented to the flow of liquid on rebound is measurably greater than that on impact; in fact, the resistance to spring flexure on impact may be on the order of 10% to 20% of the resistance presented to spring flexure on rebound.

It will be evident that with this construction a single control mechanism is provided for accurately and predictably controlling the resistance to spring flexure on both impact and rebound, and that because of the unitary control and the common temperature compensation applied to this control, compensation is accordingly applied to both types of resistance in predetermined ratio, thus avoiding any irregularities which would otherwise be unavoidable if employing a plurality of controls independently compensated. Furthermore, the passages 54 are of sufficiently ample size to insure that restriction shall occur by flow through the ports; thus, by varying the ported sleeve the same instrument is equally well adapted to right or left operation by merely altering the sleeve. Furthermore, if desired, the sleeve can be altered or a new one substituted with ports of different size and shape to permit the employment of fluids of different viscosity or different characteristics. The adjustment of the resistance to produce either a hard or soft ride may be secured from without the instrument by a bodily adjustment of the bellows thermostat and connected valve in a lengthwise direction. Furthermore, the valve and thermostat may be readily removed for servicing if so desired. Inasmuch as the pressure area is confined to the region of the passages 54 and the metering ports 64 and 66, the chamber within which the bellows thermostat is contained being substantially sealed by the plug valve, is not normally subject to unusual pressures tending to damage the thermostat or promote leakage of fluid through the sealing cap. As will be evident, the region of pressure which alternately shifts from end to end of the instrument in each case is confined to the working fluid chamber, the passage 54 communicating therewith and the metering orifice in active service at any given time.

The instrument is economical to manufacture, is simple and rugged in its design, affords the necessary controllable resistance to both impact and rebound, has a minimum of surface area for undesirable leakage except through the restricting ports, is capable of predictable operation regardless of variations in fluid viscosity, may be readily and effectively adjusted to vary the ride, and is equally capable of servicing in the event of repair being needed.

It will be noted that temperature compensation is accomplished through the employment of a metallic bellows filled with an expansible liquid which causes the bellows to expand and contract and correspondingly move the plug valve with variation in temperature. This method of control has been found definitely superior to other methods, both because of its relatively large movement for given temperature changes, and the power exerted by the bellows thermostat for adjusting the position of the valve in the event that the latter may stick or be subject to pressure considerations. An expansible rod of solid material would require such a length to impart the necessary increments of movement to the valve as to make it virtually impractical for the purpose. On the other hand, a bi-metallic type of thermostat in the shape of a spring or the like, although affording ample movement of distortion, nevertheless is totally lacking in power and could not be relied on to give a constant position of the metering or plug valve or its equivalent regardless of sticking or pressure conditions, nor could it be relied on to maintain the valve in any given position with pressure variations imposed thereon. With the liquidly filled bellows, on the other hand, the increment of movement depends upon the expansion of the liquid column, and the power created by this expansive column of liquid is irresistible and limited only by the capacity of the metallic bellows to refrain from rupture.

What is claimed is,

1. A shock absorber of the fluid type comprising two working fluid chambers and a fluid replenishing chamber, operating connections for alternately contracting each working fluid chamber upon movement in opposite directions, a fluid discharge system connecting both working fluid chambers with the replenishing chamber, a device for metering the fluid discharge system, and temperature controlled means for automatically adjusting the metering device to vary fluid discharge in accordance with variations in temperature.

2. A shock absorber comprising a casing having working fluid chambers at opposite ends and a replenishing chamber connected therewith, a double piston received within the working chambers, fluid passages in the outer ends of the working chambers terminating in a common passage to the replenishing chamber, a metering device for controlling fluid flow from both chambers into the common passage, and temperature compensated means for automatically adjusting the metering device in accordance with variations in temperature.

3. A shock absorber comprising a casing having working fluid chambers at opposite ends and a replenishing chamber connected therewith, a double piston received within the working chambers, fluid passages in the outer ends of the working chambers terminating in a common passage to the replenishing chamber, a metering device designed to present restrictions in different amounts to fluid flow from each working chamber, and temperature controlled means for automatically adjusting both restrictions simultaneously in accordance with variations in temperature.

4. A shock absorber of the fluid type comprising two working fluid chambers and a fluid replenishing chamber, operating connections for alternately contracting each working fluid chamber upon movement in opposite directions, a fluid discharge passage connecting both working fluid chambers with the replenishing chamber, means for metering the fluid discharge to provide a different and predetermined restriction to fluid flow from each working chamber, and temperature controlled means for automatically and simultaneously adjusting both restrictions to vary discharge from both working chambers in accordance with variations in temperature.

5. A shock absorber of the fluid type comprising a working fluid chamber and a fluid replenishing chamber, a piston movable in the working chamber, an actuator member for moving the piston, a fluid discharge passage extending from the working chamber to the replenishing chamber about the piston, a sleeve intersecting the passage provided with a port for restricting flow, a metering plunger movable within the sleeve in a manner to control flow through the port, a bellows thermostat operatively connected with the metering plunger, and means for anchoring the bellows thermostat at the outer end.

6. A shock absorber of the fluid type comprising a working fluid chamber and a fluid replenishing chamber, a piston movable in the working chamber, an actuator member for moving the piston, a fluid discharge passage extending from the working chamber to the replenishing chamber about the piston, a sleeve intersecting the passage provided with a port for restricting flow, a metering plunger movable within the sleeve in a manner to control flow through the port, a bellows thermostat operatively connected with the metering plunger, and means for detachably anchoring the bellows thermostat at the outer end to permit complete removal of the thermostat and connected plunger and afford access to the ported sleeve for removal and replacement.

7. A shock absorber of the fluid type comprising two working fluid chambers and a fluid replenishing chamber, a piston movable in each working chamber, a discharge system connecting the working chambers with the replenishing chamber, a sleeve provided with ports adapted respectively to separately control flow from each working chamber, and means for simultaneously metering the separate ports in the sleeve.

8. A shock absorber comprising a casing having working fluid chambers and a replenishing chamber in the casing, a piston in each working fluid chamber and means for actuating the piston, a common vent system connecting the working chambers with the replenishing chamber, a metering plunger for controlling fluid discharge through the vent into the replenishing chamber, and a thermostatic control for automatically adjusting the plunger to vary the restriction offered to fluid flow in substantial accordance with variations in viscosity of the fluid.

9. A shock absorber comprising a casing having oppositely disposed working fluid chambers at opposite ends, and an intermediate fluid replenishing chamber, two interconnected pistons slidingly received in the working chambers to move together, an actuator arm engaging between the pistons and operating them in opposite directions, fluid discharge passages extending lengthwise of the casing from the outer ends of the working chambers and terminating in a common discharge to the replenishing chamber, and a temperature controlled metering device at the junction of the passages to control fluid discharge from both working chambers in predetermined amount.

10. A shock absorber comprising a casing having oppositely disposed working fluid chambers at opposite ends, and an intermediate fluid replenishing chamber, two interconnected pistons slidingly received in the working chambers to move together, an actuator arm engaging between the pistons and operating them in opposite directions, fluid discharge passages extending lengthwise of the casing from the outer ends of the working chambers and terminating in a common discharge to the replenishing chamber, a temperature controlled metering device at the junction of the passages to control fluid discharge from both working chambers in predetermined amount, and means located in the pistons for freely replenishing the working chambers from the replenishing chamber alternately upon the non-working stroke of each piston.

11. A shock absorber of the fluid type comprising a working fluid chamber and a fluid replenishing chamber, a piston movable in the working chamber, an actuator member for moving the piston, a fluid discharge passage extending from the working chamber to the replenishing chamber about the piston, a sleeve intersecting the passage provided with a port for restricting flow, a metering plunger movable within the sleeve in a manner to control flow through the port, a thermostat operatively connected with the metering plunger at one end, and means for fixedly supporting the thermostat at the opposite end.

12. A shock absorber of the fluid type comprising a working fluid chamber and a fluid replenishing chamber, a piston movable in the working chamber, an actuator member for moving the piston, a fluid discharge passage extending from the working chamber to the replenishing chamber about the piston, a sleeve intersecting the passage provided with a port for restricting flow, a metering plunger movable within the sleeve in a manner to control flow through the port, a thermostat operatively connected with the metering plunger at one end, and means for detachably anchoring the thermostat at the opposite end to permit complete removal of the thermostat and connected plunger and afford access to the ported sleeve for removal and replacement.

13. A shock absorber of the fluid type comprising two working fluid chambers and a fluid replenishing chamber, fluid passages connecting the working and replenishing chambers, pistons located in the working chambers, means for actuating the pistons, a sleeve valve having two ports of dissimilar shape controlling fluid flow between the working and replenishing chambers and for presenting a separate and predetermined resistance to fluid flow from the working chambers, each of the ports having an enlarged portion to provide a minimum of restriction to flow, and thermostatically controlled means for normally uncovering the enlarged portion of the ports to substantially remove resistance to fluid flow upon temperature drop to a predetermined region.

WALTER C. ROBBINS.